United States Patent
VanBuskirk et al.

(10) Patent No.: US 9,346,561 B2
(45) Date of Patent: May 24, 2016

(54) MEASUREMENT OF COUPLING MISALIGNMENT OF A DRIVESHAFT

(71) Applicant: Bell Helicopter Textron Inc., Fort Worth, TX (US)

(72) Inventors: Matthew VanBuskirk, Bedford, TX (US); Michael Seifert, Southlake, TX (US)

(73) Assignee: Bell Helicopter Textron Inc., Ft. Worth, TX (US)

( * ) Notice: Subject to any disclaimer, the term of this patent is extended or adjusted under 35 U.S.C. 154(b) by 21 days.

(21) Appl. No.: 14/158,154

(22) Filed: Jan. 17, 2014

(65) Prior Publication Data

US 2014/0207332 A1    Jul. 24, 2014

Related U.S. Application Data

(60) Provisional application No. 61/753,977, filed on Jan. 18, 2013.

(51) Int. Cl.
*B64F 5/00* (2006.01)
*B64C 27/14* (2006.01)
*G01B 21/24* (2006.01)
*B64D 45/00* (2006.01)
*F16C 1/04* (2006.01)
*F16C 1/08* (2006.01)

(52) U.S. Cl.
CPC .............. *B64F 5/0045* (2013.01); *B64C 27/14* (2013.01); *B64D 45/00* (2013.01); *G01B 21/24* (2013.01); *B64D 2045/0085* (2013.01); *F16C 1/04* (2013.01); *F16C 1/08* (2013.01)

(58) Field of Classification Search
CPC .......... F16D 2300/18; F16C 1/04; F16C 1/08; B64C 27/14
See application file for complete search history.

(56) References Cited

U.S. PATENT DOCUMENTS 4,207,758 A * 6/1980 Stone ............................. 464/55
8,079,274 B2 * 12/2011 Mian et al. ............... 73/862.335

* cited by examiner

*Primary Examiner* — Todd Melton
(74) *Attorney, Agent, or Firm* — Bell Helicopter Textron Inc.

(57) ABSTRACT

According to one embodiment, a system for measuring coupling misalignment of a rotorcraft drive shaft includes a reference device and a sensor. The sensor is configured to receive a signal from the reference device indicative of a distance between the reference device and the sensor. The reference device and the sensor are configured to be disposed on opposite sides of a flexible coupling coupled to the drive shaft and disposed between the engine and the pylon. The flexible coupling is configured to rotate with the drive shaft and comprises a flexure portion configured to flex in response to a difference in alignment between the engine and the pylon. A misalignment measurement system may be configured to generate a misalignment value in response to the signal.

20 Claims, 5 Drawing Sheets

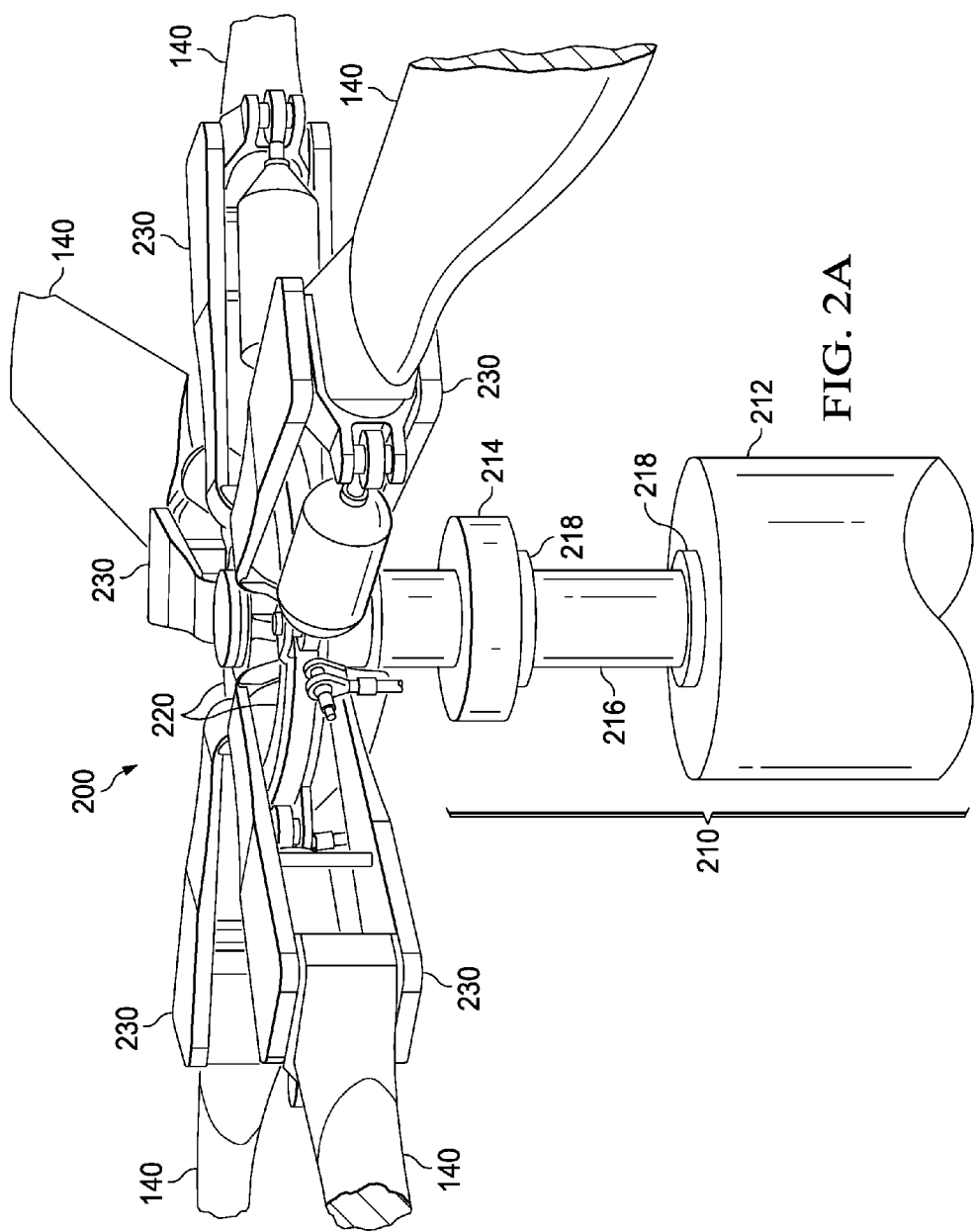

MEASUREMENT OF COUPLING MISALIGNMENT OF A DRIVESHAFT

RELATED APPLICATIONS

Pursuant to 35 U.S.C. §119 (e), this application claims priority to U.S. Provisional Patent Application Ser. No. 61/753,977, entitled MEASUREMENT OF COUPLING MISALIGNMENT OF A DRIVESHAFT, filed Jan. 16, 2013. U.S. Provisional Patent Application Ser. No. 61/753,977 is hereby incorporated by reference.

TECHNICAL FIELD

This invention relates generally to rotor systems, and more particularly, to measurement of coupling misalignment of a driveshaft.

BACKGROUND

Driveshafts may be used transmit power between two devices. For example, a driveshaft may be provided between an engine and a transmission in a rotorcraft. A driveshaft may become misaligned, however, if one device moves in relation to another.

In the rotorcraft example, misalignment and chucking may be indirectly measured by conducting an elaborate pylon pull test. In a pylon pull test, driveshaft coupling motions are calibrated to transmission motions. Input driveshaft motions are then inferred in flight test from measured pylon motions (directly measured) using the calibration equations derived from the pull test data. This method, however, can be cumbersome and prone to error. A pylon pull test may require months of planning and execution. For example, an example pylon pull test could require over 1000 man hours as well as expensive tools, equipment, and facilities. In addition, depending on the complexity of the specific rotorcraft, the pull test may require 1-3 weeks of time to complete. During a development program under tight schedule constraints the required week(s) can be detrimental.

SUMMARY

Teachings of certain embodiments recognize the capability to directly measure misalignment and chucking. Teachings of certain embodiments recognize the capability to incorporate such measurement techniques into a permanent HUMS system, which could continuously monitor driveshaft misalignment and more accurately determine if a driveshaft has exceeded limits. Teachings of certain embodiments recognize the capability to provide more accurate misalignment information and negate the need for costly static testing.

One example embodiment recognizes the capability to directly determine coupling misalignment and chucking of a driveshaft installed on a rotorcraft during flight (e.g., during flight testing or during regular operation). In this example embodiment, measurement devices may be installed on the fixed system (e.g., near the transmission) side of the driveshaft coupling. Examples of measurement devices may include hall sensor(s)/probe(s), infrared sensor(s), and laser(s). These precision devices may be mounted at four clock positions around the circumference of the driveshaft input flange. Reciprocal to these, four reference devices may be mounted on the rotating side of the coupling. These reference devices may, for example, be magnets if the measurement devices were hall sensors/probes or reflective surfaces if the measurement devices were lasers or infrared sensors. In tandem, these devices may determine distances between the fixed system side of the coupling (e.g., near the transmission) and the rotating system (e.g., the driveshaft) at the four clock positions. The known distances could then be used to determine coupling misalignment angle as well as chucking (axial misalignment).

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2A shows the rotor system and blades of the rotorcraft of FIG. 1 according to one example embodiment;

DETAILED DESCRIPTION OF THE DRAWINGS

Figure 1:
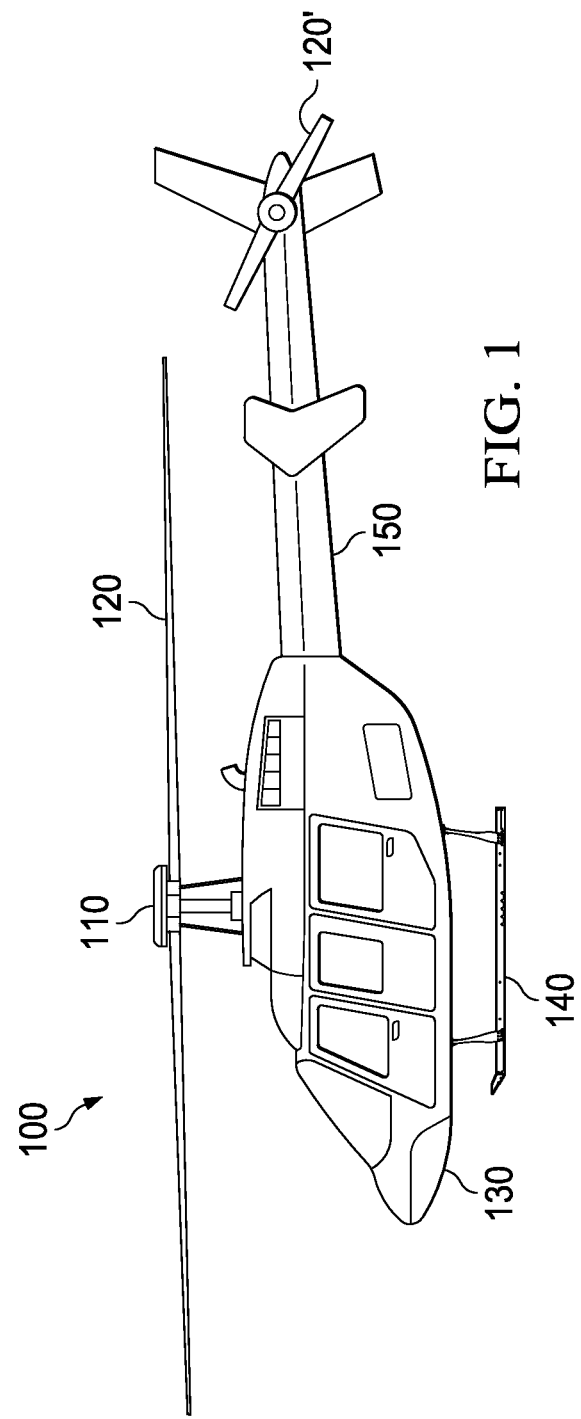
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

FIG. 2A shows a rotor system 200 according to one example embodiment. Rotor system 200 may represent one example of rotor system 110 of FIG. 1. Rotor system 200 features a drive train 210, a hub 220, and grips 130 coupled to blades 140. In this example embodiment, drive train 210 features an engine 212, a pylon 214, a drive shaft 216, and flexible couplings 218. In some examples, rotor system 200 may include more or fewer components. For example, FIG. 1 does not show components such as a gearbox, a swash plate, drive links, drive levers, and other components that may be incorporated. Furthermore, FIG. 2A represents a conceptual view, and components such as engine 212, pylon 214, and other components of rotor system 200 may not represent the shape/size/scale of an actual aircraft component.

Components such as engine 212, drive shaft 216, and hub 220 are mechanical components for generating and transmitting torque and rotation. In operation, drive shaft 216 receives torque or rotational energy from engine 212 and rotates hub 220. Blades 140 are coupled to hub 220 by grips 230. Rotation of hub 220 causes grips 230 and blades 140 to rotate about drive shaft 210.

Teachings of certain embodiments recognize that flexible couplings 218 may allow drive shaft 216 to be coupled between engine 212 and pylon 214 even if engine 212 and pylon 214 are not in perfect alignment. Misalignment between engine 212 and pylon 214 may occur for a variety of reasons. For example, in a hard-mounted rotor system, engine 212 and pylon 214 may become misaligned during the manufacturing process. In addition, in a soft-mounted rotor system, engine 212 and pylon 214 may become misaligned as components of rotor system 200 move, shift, and/or vibrate during operation of rotorcraft 100.

Figure 2B:
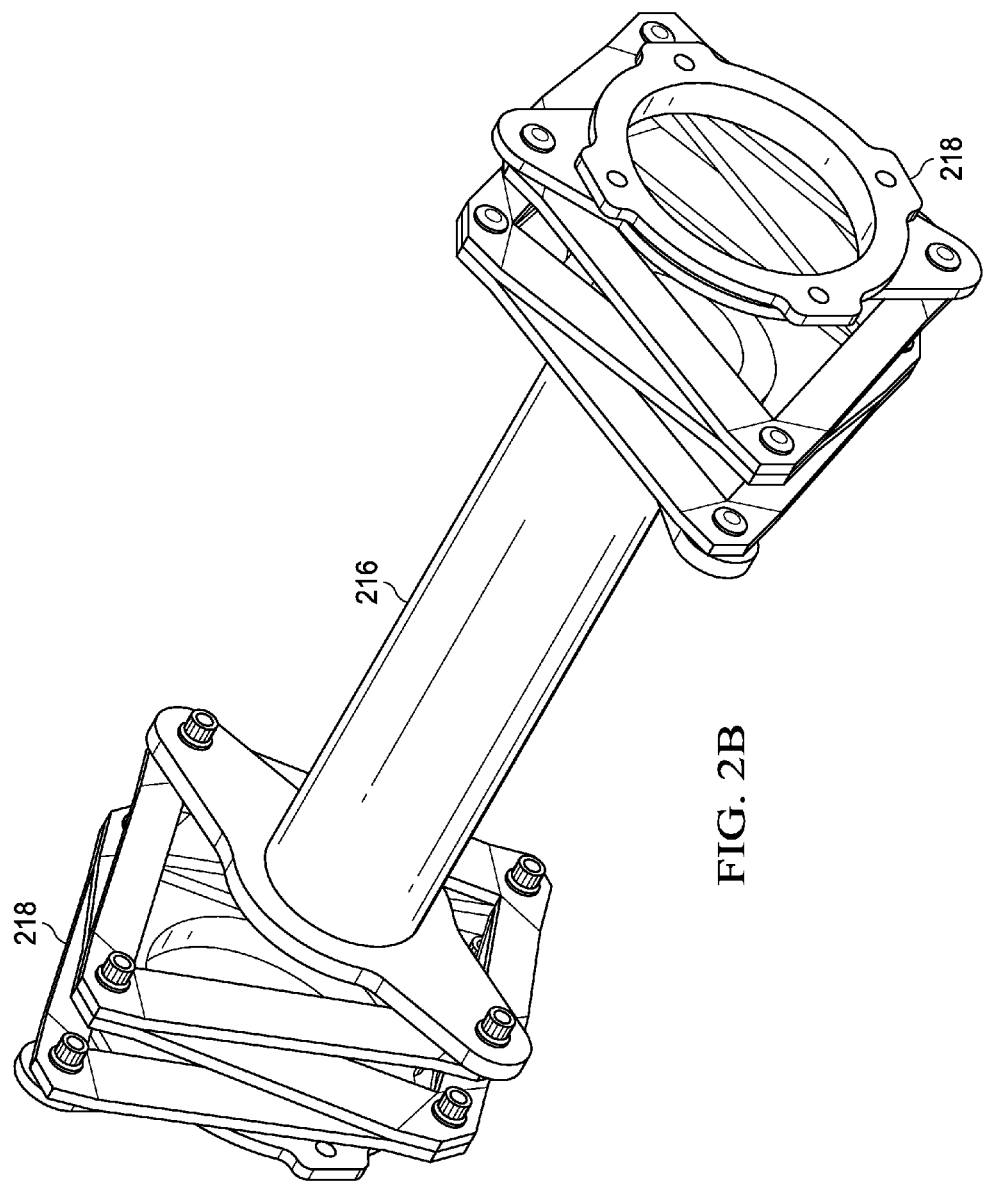
FIG. 2B shows a perspective view of the drive shaft and flexible couplings of FIG. 2A according to one example embodiment.

FIG. 2B shows a perspective view of drive shaft 216 and flexible couplings 218 according to one example embodiment. In this example embodiment, flexible couplings 218 are shown as KAflex couplings available from Kaman Aerospace. In this example embodiment, each flexible coupling includes flex frames that transfer torque to/from drive shaft 216 while allowing misalignment across drive shaft 216.

Although some misalignment between engine 212 and pylon 214 may be expected in some scenarios, excess misalignment may result in damage to components of rotor system 200 and/or rotorcraft 100. Examples of excess misalignment may include, but are not limited to, large deflection angles and large vibrations (even at smaller deflection angles). Teachings of certain embodiments recognize the ability to detect excess misalignment may ultimately allow for safer rotorcraft design, testing, and operation.

The potential benefits of detecting such misalignment, however, may be limited by the ability to measure such misalignment accurately. For example, estimation of misalignment using indirect measurements may be less accurate and provide less useful information than direct measurement of misalignment. As one example, misalignment between an engine and a pylon may be estimated by measuring pylon movement and using equations derived from pylon-pull tests to approximate misalignment in the flexible couplings. Such an approach, although useful in some applications, may provide less accurate information than direct measurement of coupling misalignment.

Figure 3:
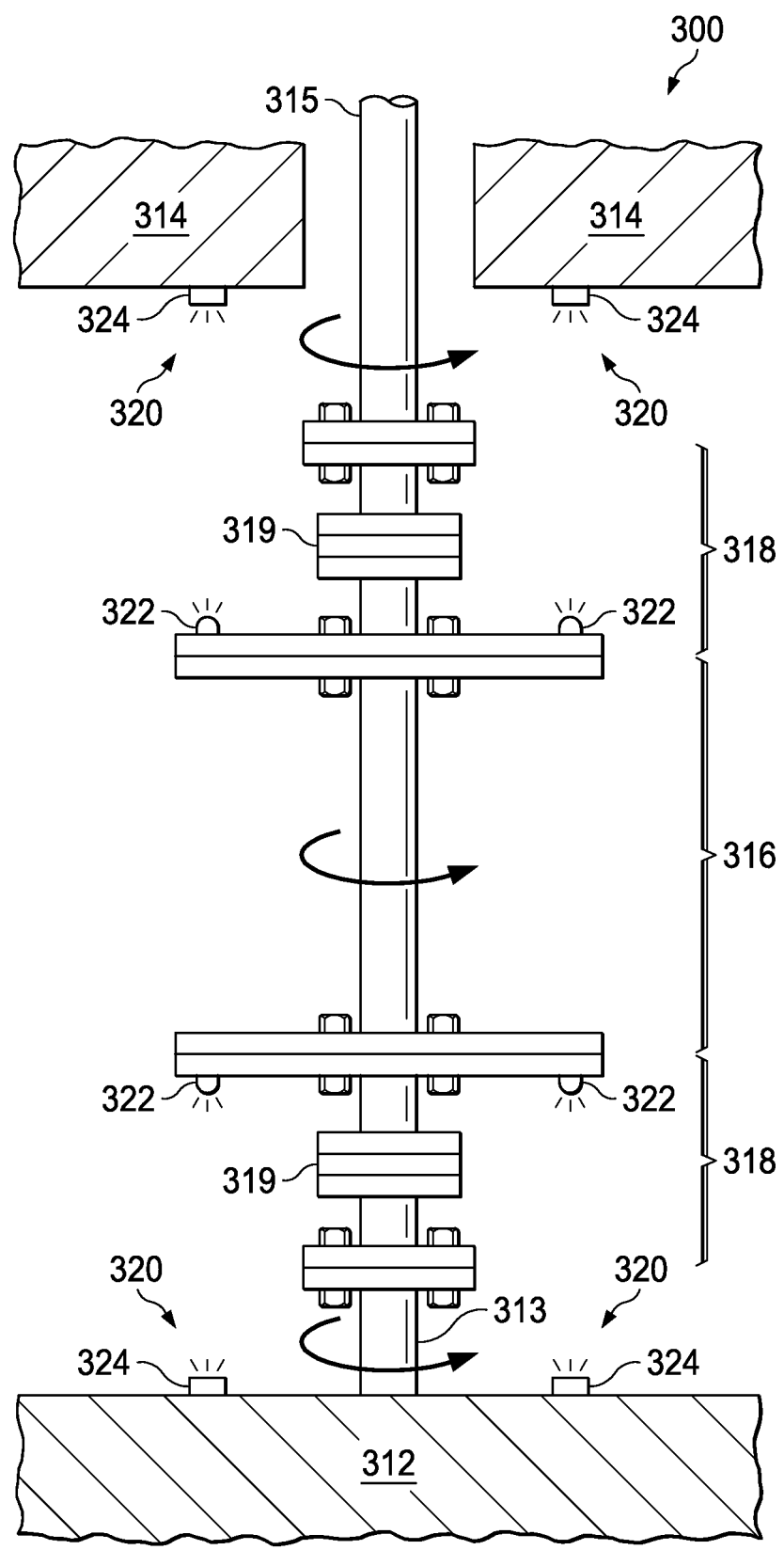
FIG. 3 shows a driveshaft coupling system featuring a misalignment measurement system according to one example embodiment.
Figure 4:
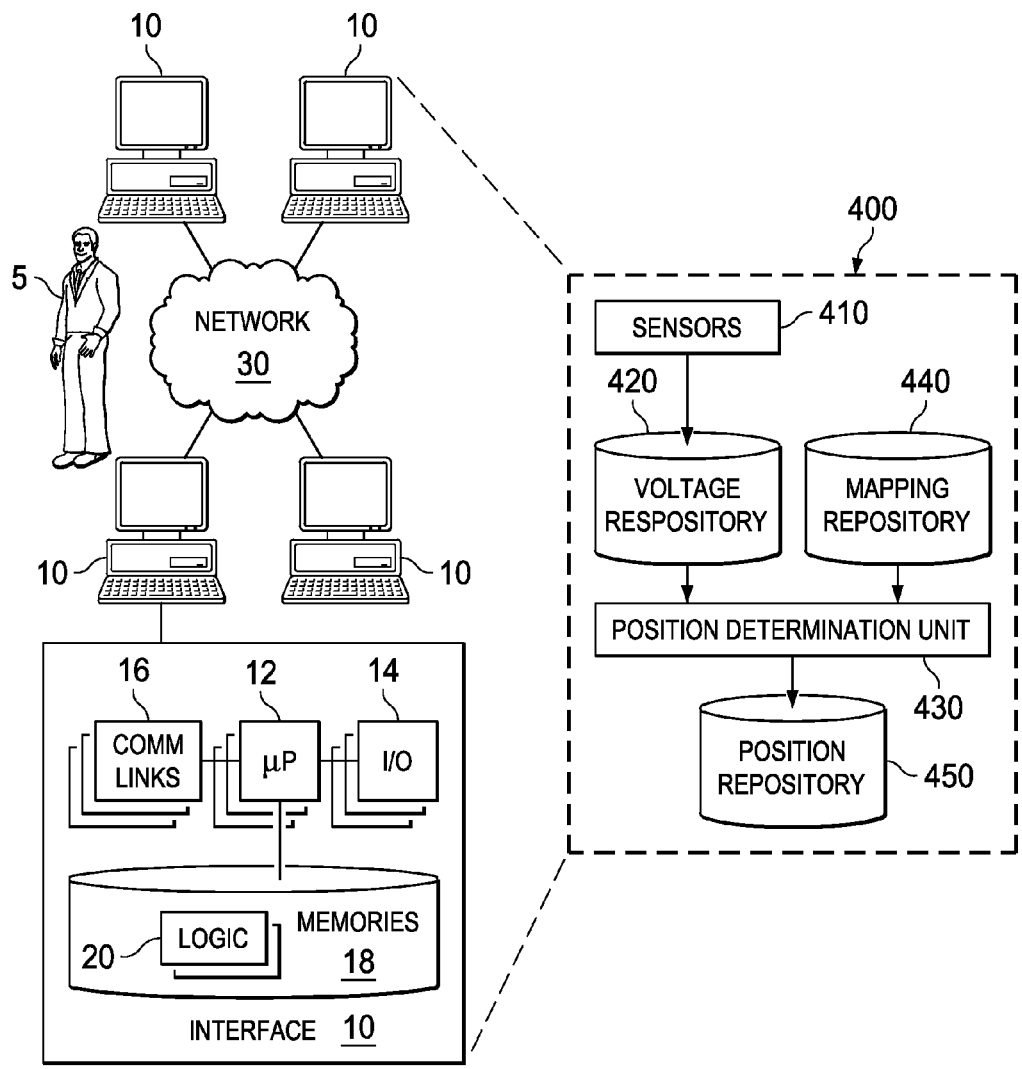
FIG. 4 shows a misalignment measurement system according to one example embodiment.

Accordingly, teachings of certain embodiments recognize the capability to directly measure coupling misalignment of a drive shaft. FIG. 3 shows a driveshaft coupling system 300 featuring a misalignment measurement system 320 according to one example embodiment. In the example of FIG. 3, driveshaft coupling system 300 includes an engine 312 having a rotating output shaft 313, a pylon 314 having a rotating input shaft 315, a rotating drive shaft 316, and flexible couplings 318 coupling drive shaft 316 to output shaft 313 and input shaft 315. Although not shown in FIG. 3, in some embodiments, rotating input shaft 315 may be in mechanical communication with one or more components of a rotor system, such as hub 220 of rotor system 200.

Measurement system 320 features reference devices 322 and sensors 324. In the example of FIG. 3, reference devices 322 and sensors 324 are located on opposite sides of the flexure portion 319 of couplings 318. In this example, flexure portions 319 represent portions of couplings 318 that are configured to flex in response to misalignment of engine 312 and pylon 314.

In operation, according to one example embodiment, sensor 324 is situated opposite flexure portion 319 from a reference device 322 and is configured to receive a signal from the opposing reference device 322. A misalignment measurement system may generate a misalignment value in response to the received signal.

In the example of FIG. 3, reference device 322 is configured to rotate with drive shaft 316 and flexible couplings 318, and sensors 324 are configured to remain stationary with engine 312 and pylon 314. In this example, each reference device 322 may pass by a corresponding sensor 324 once per revolution. In this manner, sensor 324 may enable the misalignment measurement system to provide time and frequency data in addition to the misalignment value. As one example, misalignment measurement system may provide misalignment measurements over time indicative of vibrations.

Also in the example of FIG. 3, two flexible couplings 318 are provided on opposite ends of drive shaft 316, and each flexible coupling 318 is surrounded by reference devices 322 and opposing sensors 324. Teachings of certain embodiments recognize that providing reference devices 322 and sensors 324 proximate to both flexible couplings 318 may provide more accurate information for measuring certain types of movements, such as chucking (axial displacement) of drive shaft 316.

In one example embodiment, reference device 322 represents a magnet. Magnets may include any material that produces a magnetic field. A magnetic field may represent the magnetic influence of a magnet on electric currents and other magnetic materials. Examples of magnets 322 may include, but are not limited to, ferromagnetic materials, composite magnetic materials, rare-earth magnets, and electromagnets.

In this example, sensor 324 may represent a Hall-effect sensor configured to receive energy from the generated magnetic field. Sensor 324 may generate a voltage measurement based on the received magnetic energy, and the misalignment measurement system may generate the misalignment value based on the voltage measurement.

One example of a Hall-effect sensor may include a transducer that varies its output voltage in response to a magnetic field. In some embodiments, each sensor 324 may vary its output voltage based on the magnetic field produced by magnets 322. Because the magnetic field produced by magnets 322 is stronger near magnets 310 and weaker away from magnets 310322 the value of the voltage output of each sensor 324 may depend on its proximity to magnets 322. In this manner, each voltage output from sensors 324 may indicate the position of magnets 322 from sensors 324.

In some embodiments, other sensors may be used in place of and/or in addition to sensors 324. One example would be a magneto resistive bridge sensor which measures the magnetic flux orientation, rather than the magnetic flux magnitude. This sensor type operates in saturation mode, and can allow for larger changes in magnetic flux strength. This may enable various advantages for the intelligent sensor system, such as the use of smaller and/or fewer magnets to generate the field through which the sensor array operates.

In yet an alternative embodiment, the field and sensor type may be some type other than magnetic in nature. For example, the field could be optical, generated by a light source such as an LED or laser. The sensor array would likewise sense either the magnitude or orientation of the light field permeating from the source in 3D space. Certain advantages may be obtained from an optical medium such as greater allowable distance between the field source and the sensor arrays compared to a magnetic based field and array system.

An alternative embodiment would include a hybrid sensor array consisting of two or more sensor types. For example, a hybrid magnetic sensor array may have sensors that detect magnetic strength (Hall-type) and magnetic flux orientation (magneto-resistive). Certain advantages may be obtained from a hybrid sensor array of this type such as reduced magnetic field requirements and increased sensor system accuracy or precision. In another hybrid embodiment, one or more field and/or sensor types could be used in combination. For example, a magnetic sensor could be used in combination with an optical sensor to detect a combined magnetic and optical field combination. This combination might allow certain advantages such as higher accuracy and precision with certain allowance for optical contamination.

Teachings of certain embodiments recognize that measurement system 320 may be utilized in both a test environment and on an operational aircraft. In a test environment, measurement system 320 may provide accurate measurements that may be used to analyze driveshaft coupling misalignment, component vibration, and other characteristics.

In addition, measuring during operation of the rotorcraft increases the amount data available as compared to only measuring in a test environment. Furthermore, measuring during operation may allow maintenance crews to determine whether parts need replacement based on the strains and stresses they have experienced during operation. For example, measuring during operation may allow for accurate prediction of when elastomeric bearing 250 should be replaced. Such functions may be incorporated as part of an integrated vehicle health management (IVHM) system that monitors vehicle usage. In addition, measuring during operation of the aircraft may allow for accurate determinations of fatigue usage credits.

FIG. 10 shows a misalignment measurement system 400 according to one embodiment. In general, system 400 features sensors 410, a voltage repository 420, a position determination unit 430, a mapping repository 440, and a position repository 450, that may be implemented by one or more computer systems 10.

All, some, or none of the components of system 400 may be located on or near rotorcraft 100. For example, in one example embodiment, sensors 410 are incorporated into driveshaft coupling system 300, voltage repository 420 may be located elsewhere on fuselage 130, and position determination unit 430, mapping repository 440, and position repository 450 may be located remotely from rotorcraft 100.

Users 5 may access system 100 through computer systems 10. For example, in some embodiments, users 5 may access voltage repository 420, mapping repository 440, and/or position repository 450 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Sensors 410 may represent sensors that detect a topography and output one or more signals that reflect that topography. In one example embodiment, sensors 410 are Hall-effect sensors that detect a magnetic topography that is the result of magnetic fields produced by one or more magnets. In this example embodiment, sensors 410 vary an output voltage in response to the detected magnetic topography. One example of sensors 410 may include sensors 324 of measurement system 320.

Voltage repository 420 stores measurements of the output voltages from sensors 410. In some embodiments, voltage repository 420 may store a set of voltages representative of the topography detected by sensors 410. If sensors 410 collect multiple measurements over time, voltage repository 420 may store each set of voltages with a time stamp.

Position determination unit 430 converts the voltage values stored in voltage repository 420 into displacements in space. These displacements in space may be used to calculate coupling misalignment of drive shaft 316.

In some embodiments, position determination unit 430 compares stored voltage measurements from voltage repository 420 to stored voltage combinations from mapping repository 440. Mapping repository 440 stores a plurality of mapping voltage records. Each mapping voltage record includes one or more voltage values and a location, distance, or other value corresponding to those voltage values.

Mapping repository 440 may be populated with mapping voltage records in a variety of ways. In one example embodiment, driveshaft 316 may be moved in a variety of positions, and the voltages from sensors 324 may be recorded at each position along with the location of reference devices 322 relative to sensors 324.

Position determination unit 430 may determine coupling misalignment by comparing the stored measurements from voltage repository 420 to one or more of the mapping voltage records from mapping repository 440. In one example embodiment, position determination unit 430 identifies the mapping voltage record having voltages closest to the stored measurements from voltage repository 420 and then selects the location identified in the identified mapping voltage record. In another example embodiment, position determination unit 430 selects multiple mapping voltage records and then interpolates between them to identify a more accurate location for the stored measurements from voltage repository 420.

Thus, teachings of certain embodiments recognize the capability of position determination unit 430 to determine coupling misalignment based on signals from sensors 410 (e.g., the location of reference devices 322 relative to sensors 324 based on voltage measurements from sensors 324).

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
    a body;
    a rotor system comprising a pylon, a hub disposed adjacent to the pylon, and a rotor blade in mechanical communication with the hub;
    an engine;
    a drive shaft in mechanical communication with the power hub and the engine and configured to rotate the hub in response to receiving rotational energy from the engine;
    a flexible coupling coupled to the drive shaft and disposed between the engine and the pylon, the flexible coupling configured to rotate with the drive shaft and comprising a flexure portion configured to flex in response to a difference in alignment between the a rotational axis associated with the engine and a rotational axis associated with the pylon, the difference in alignment occurring when the engine and the pylon are positioned such that the rotational axis associated with the engine and the rotational axis associated with the pylon are not coaxial; and
    a measurement system configured to measure the difference in alignment occurring when the engine and the pylon are positioned such that the rotational axis associated with the engine and the rotational axis associated with the pylon are not coaxial, the measurement system comprising:
        a reference device;
        a sensor situated opposite the flexure from the reference device and configured to receive a signal from the reference device indicative of a distance between the reference device and the sensor; and
        a misalignment measurement system configured to generate, in response to the signal, a misalignment value that represents the difference in alignment occurring when the engine and the pylon are positioned such that the rotational axis associated with the engine and the rotational axis associated with the pylon are not coaxial.

2. The rotorcraft of claim 1, wherein the reference device is disposed proximate to and configured to rotate with the drive shaft.

3. The rotorcraft of claim 2, wherein the sensor is disposed proximate to and configured to remain stationary with at least one of the pylon and the engine.

4. The rotorcraft of claim 1, wherein:
the flexible coupling is disposed proximate to the pylon;
the reference device is disposed proximate to and configured to rotate with the drive shaft; and
the sensor is disposed proximate to and configured to remain stationary with the pylon.

5. The rotorcraft of claim 4, further comprising:
a second flexible coupling disposed proximate to the engine, the second flexible coupling configured to rotate with the drive shaft and comprising a second flexure portion configured to flex in response to a difference in alignment between the engine and the pylon;
a second reference device disposed proximate to and configured to rotate with the drive shaft; and
a second sensor situated opposite the second flexure from the second reference device and configured to remain stationary with the engine, the second sensor configured to receive a signal from the second reference device indicative of a distance between the second reference device and the second sensor.

6. The rotorcraft of claim 1, wherein:
the reference device comprises a magnet operable to generate a magnetic field; and
the sensor comprises a Hall-effect sensor configured to receive the signal comprising energy from the generated magnetic field indicative of the distance between the reference device and the sensor.

7. The rotorcraft of claim 6, wherein the Hall-effect sensor is operable to:
receive an input voltage;
detect the magnetic field from the magnet; and
vary an output voltage in response to the detected magnetic field.

8. The rotorcraft of claim 6, wherein:
the sensor is operable to generate a voltage measurement based on the received signal indicative of the distance between the reference device and the sensor;
the misalignment measurement system is configured to generate a misalignment value in response to the voltage measurement.

9. The rotorcraft of claim 8, the misalignment measurement system operable to generate the misalignment value in response to the voltage measurement by comparing the voltage measurement to a plurality of voltage records, each voltage record identifying:
a recorded misalignment value; and
one or more voltage values corresponding to the recorded misalignment value.

10. The rotorcraft of claim 1, wherein:
the sensor comprises a laser generator configured to transmit laser energy towards the reference device and receive at least a portion of the transmitted laser energy reflected off the reference device back towards the sensor.

11. A method for measuring coupling misalignment of a rotorcraft drive shaft, the rotorcraft drive shaft disposed between an engine and a pylon and configured to rotate at least one component of a rotor system in response to receiving rotational energy from the engine, the method comprising:
providing a reference device and a sensor disposed on opposite sides of a flexible coupling coupled to the drive shaft and disposed between the engine and the pylon, the flexible coupling configured to rotate with the drive shaft and comprising a flexure portion configured to flex in response to a difference in alignment between the a rotational axis associated with the engine and a rotational axis associated with the pylon, the difference in alignment occurring when the engine and the pylon are positioned such that the rotational axis associated with the engine and the rotational axis associated with the pylon are not coaxial;
receiving, at the sensor, a signal from the reference device indicative of a distance between the reference device and the sensor; and
generating, in response to the signal, a misalignment value that represents the difference in alignment occurring when the engine and the pylon are positioned such that the rotational axis associated with the engine and the rotational axis associated with the pylon are not coaxial.

12. The method of claim 11, wherein the reference device is disposed proximate to and configured to rotate with the drive shaft.

13. The method of claim 12, wherein the sensor is disposed proximate to and configured to remain stationary with at least one of the pylon and the engine.

14. The method of claim 11, wherein:
the reference device comprises a magnet operable to generate a magnetic field; and
receiving, at the sensor, a signal from the reference device indicative of a distance between the reference device and the sensor comprises receiving, at the sensor, energy from the generated magnetic field indicative of the distance between the reference device and the sensor.

15. The method of claim 14, further comprising:
receiving an input voltage;
detecting the magnetic field from the magnet; and
varying an output voltage in response to the detected magnetic field.

16. A system for measuring coupling misalignment of a rotorcraft drive shaft, the rotorcraft drive shaft disposed between an engine and a pylon and configured to rotate at least one component of a rotor system in response to receiving rotational energy from the engine, the system comprising:
a reference device;
a sensor configured to receive a signal from the reference device indicative of a distance between the reference device and the sensor, the reference device and the sensor configured to be disposed on opposite sides of a flexible coupling coupled to the drive shaft and disposed between the engine and the pylon, the flexible coupling configured to rotate with the drive shaft and comprising a flexure portion configured to flex in response to a difference in alignment between the a rotational axis associated with the engine and a rotational axis associated with the pylon, the difference in alignment occurring when the engine and the pylon are positioned such that the rotational axis associated with the engine and the rotational axis associated with the pylon are not coaxial; and
a misalignment measurement system configured to generate, in response to the signal, a misalignment value that represents the difference in alignment occurring when the engine and the pylon are positioned such that the rotational axis associated with the engine and the rotational axis associated with the pylon are not coaxial.

17. The system of claim 16, wherein the reference device is disposed proximate to and configured to rotate with the drive shaft.

18. The system of claim 16, wherein the sensor is disposed proximate to and configured to remain stationary with at least one of the pylon and the engine.

19. The system of claim 16, wherein:
the reference device comprises a magnet operable to generate a magnetic field; and
the sensor comprises a Hall-effect sensor configured to receive the signal comprising energy from the generated magnetic field indicative of the distance between the reference device and the sensor.

20. The system of claim 19, wherein the Hall-effect sensor is operable to:
receive an input voltage;
detect the magnetic field from the magnet; and
vary an output voltage in response to the detected magnetic field.

* * * * *